(12) United States Patent
Hao et al.

(10) Patent No.: US 7,760,203 B1
(45) Date of Patent: Jul. 20, 2010

(54) GRAPHIC COLOR-PIXEL-BASED VISUAL-ANALYTIC REPRESENTATIONS FOR DATASETS

(75) Inventors: Ming C. Hao, Palo Alto, CA (US); Umeshwar Dayal, Palo Alto, CA (US); Martha Lyons, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 11/742,512

(22) Filed: Apr. 30, 2007

(51) Int. Cl.
*G06T 11/20* (2006.01)
(52) U.S. Cl. .................................................. 345/440.2
(58) Field of Classification Search ................ 345/440, 345/440.2
See application file for complete search history.

(56) References Cited

U.S. PATENT DOCUMENTS

| | | | |
|---|---|---|---|
| 3,487,308 A | 12/1969 | Johnson | |
| 5,581,797 A | 12/1996 | Baker et al. | |
| 5,588,117 A | 12/1996 | Karp et al. | |
| 5,608,904 A | 3/1997 | Chaudhuri et al. | |
| 5,623,590 A | 4/1997 | Becker et al. | |
| 5,634,133 A | 5/1997 | Kelley | |
| 5,659,768 A | 8/1997 | Forbes et al. | |
| 5,694,591 A | 12/1997 | Du et al. | |
| 5,742,778 A | 4/1998 | Hao et al. | |
| 5,757,356 A | 5/1998 | Takeasaki et al. | |
| 5,801,688 A | 9/1998 | Mead et al. | |
| 5,828,866 A | 10/1998 | Hao et al. | |
| 5,844,553 A | 12/1998 | Hao et al. | |
| 5,878,206 A | 3/1999 | Chen et al. | |
| 5,903,891 A | 5/1999 | Chen et al. | |
| 5,924,103 A | 7/1999 | Ahmed et al. | |
| 5,929,863 A | 7/1999 | Tabei et al. | |
| 5,940,839 A | 8/1999 | Chen et al. | |
| 5,986,673 A | 11/1999 | Martz | |
| 5,999,193 A | 12/1999 | Conley, Jr. et al. | |
| 6,052,890 A | 4/2000 | Malagrino, Jr. et al. | |
| 6,115,027 A | 9/2000 | Hao et al. | |
| 6,144,379 A | 11/2000 | Bertram et al. | |
| 6,211,880 B1 | 4/2001 | Impink, Jr. | |
| 6,211,887 B1 | 4/2001 | Meier et al. | |
| 6,269,325 B1 | 7/2001 | Lee et al. | |
| 6,314,453 B1 | 11/2001 | Hao et al. | |
| 6,356,285 B1 * | 3/2002 | Burkwald et al. | 715/853 |
| 6,377,287 B1 | 4/2002 | Hao et al. | |
| 6,400,366 B1 | 6/2002 | Davies et al. | |
| 6,429,868 B1 | 8/2002 | Dehner, Jr. et al. | |
| 6,466,946 B1 | 10/2002 | Mishra et al. | |
| 6,502,091 B1 | 12/2002 | Chundi et al. | |
| 6,584,433 B1 | 6/2003 | Zhang et al. | |

(Continued)

OTHER PUBLICATIONS

Deun et al., Multidimensional Scaling, Open and Distance Learning, Jan. 12, 2000 (pp. 1-16).

(Continued)

*Primary Examiner*—Ryan R Yang

(57) ABSTRACT

Provided are, among other things, systems, methods and techniques for displaying data by accessing a set of data records that have associated indexes and generating pixels to represent the data records, the colors of the pixels being based on attribute values of the data records. The pixels are arranged into lines based on the associated indexes, with each line corresponding to a segment of indexes and adjacent lines corresponding to adjacent segments, and the arranged pixels are displayed.

17 Claims, 11 Drawing Sheets

U.S. PATENT DOCUMENTS

| | | | |
|---|---|---|---|
| 6,590,577 | B1 | 7/2003 | Yonts |
| 6,603,477 | B1 | 8/2003 | Tittle |
| 6,658,358 | B2 | 12/2003 | Hao et al. |
| 6,684,206 | B2 | 1/2004 | Chen et al. |
| 6,727,926 | B1 | 4/2004 | Utsuki et al. |
| 6,750,864 | B1 * | 6/2004 | Anwar ............ 345/440 |
| 6,822,649 | B1 * | 11/2004 | Schol ............ 345/440 |
| 7,020,869 | B2 | 3/2006 | Abari et al. |
| 7,072,096 | B2 * | 7/2006 | Holman et al. ............ 359/298 |
| 7,193,628 | B1 | 3/2007 | Phillips et al. |
| 7,202,868 | B2 | 4/2007 | Hao |
| 7,221,474 | B2 | 5/2007 | Hao et al. |
| 7,313,533 | B2 | 12/2007 | Chang et al. |
| 7,379,601 | B2 * | 5/2008 | Yang et al. ............ 382/224 |
| 7,512,624 | B2 * | 3/2009 | Ankerst ............ 707/102 |
| 7,567,250 | B2 | 7/2009 | Hao et al. |
| 2002/0118193 | A1 | 8/2002 | Halstead, Jr. |
| 2003/0065546 | A1 | 4/2003 | Goruer et al. |
| 2003/0071815 | A1 | 4/2003 | Hao et al. |
| 2003/0221005 | A1 | 11/2003 | Betge-Brezetz et al. |
| 2004/0095349 | A1 * | 5/2004 | Bito et al. ............ 345/440 |
| 2004/0210540 | A1 | 10/2004 | Israel et al. |
| 2005/0066026 | A1 | 3/2005 | Chen et al. |
| 2005/0088441 | A1 * | 4/2005 | Hao et al. ............ 345/440 |
| 2005/0119932 | A1 | 6/2005 | Hao |
| 2005/0168467 | A1 * | 8/2005 | Ankerst ............ 345/440 |
| 2005/0219262 | A1 | 10/2005 | Hao et al. |
| 2006/0164418 | A1 * | 7/2006 | Hao et al. ............ 345/440 |
| 2007/0225986 | A1 | 9/2007 | Bowe, Jr. et al. |
| 2009/0033664 | A1 | 2/2009 | Hao et al. |

OTHER PUBLICATIONS http://www.pavis.org/essay/multidimensional_scaling.html, 2001 Wojciech Basalaj, (pp. 1-30).

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining ," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

D. Keim et al "Hierarchical Pixel Bar Charts", IEEE Transactions on Visualization and Computer Graphics, vol. 8, No. 3, Jul.-Sep. 2002, pp. 255-269.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

U.S. Appl. No. 11/076,700 entitled "A Method and System for Creating Visualizations" filed Mar. 10, 2005, pp. 1-31.

U.S. Appl. No. 11/523,240 entitled "Time Relevance-Based Visualization of Data" filed Sep. 19, 2006, pp. 1-22.

* cited by examiner

US 7,760,203 B1

GRAPHIC COLOR-PIXEL-BASED VISUAL-ANALYTIC REPRESENTATIONS FOR DATASETS

FIELD OF THE INVENTION

The present invention pertains to systems, methods and techniques for displaying data using certain patterns of colored pixels, and is particularly useful for the display of large amounts of data, such as large volumes of data collected by a sensor or data pertaining to sales, system performance or other transactions.

BACKGROUND

It is common for data to be graphically displayed by using a two-dimensional plot in which the horizontal axis corresponds to time or some other independent variable, and the vertical axis corresponds to the value of the dependent variable (or parameter) that one wishes to visualize.

DESCRIPTION OF THE PREFERRED EMBODIMENT(S)

While the conventional technique described above works well for small amounts of data, the present inventors have observed that it generally is not practical when one wishes to display a large amount of data in a relatively small space, such as the space provided on a typical computer monitor. In such cases, the data points become crowded together, resulting in over-plotting and making meaningful distinctions and interpretations all but impossible. The present invention addresses this problem by providing, among other things, a three-dimensional data plot within a two-dimensional space, with pixel color representing the third dimension.

Figure 1:
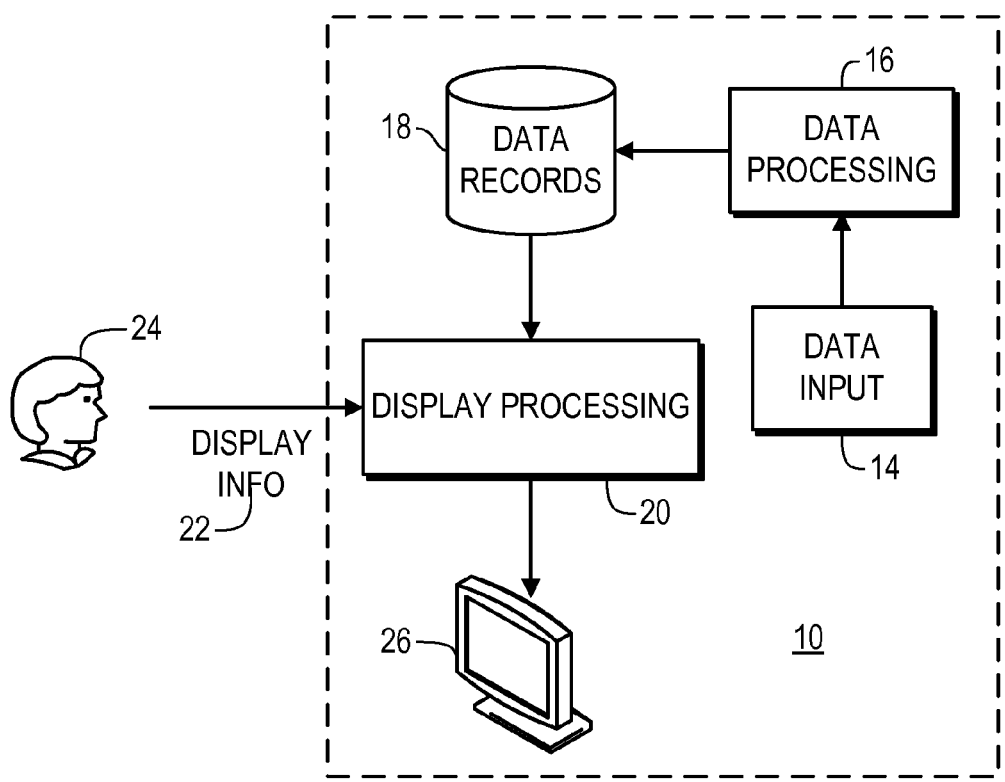
FIG. 1 illustrates a block diagram of a system in which color display processing may be implemented according to a representative embodiment of the present invention.

FIG. 1 shows a block diagram of an overall system 10 according to a representative embodiment of the present invention. Data are input into system 10 using an input device 14, which might include, e.g., a sensor, a computer terminal, any other kind of automated data collection or input device, or any other kind of device for manually entering data, with the specific input device 14 typically depending upon the type of data that are being collected and whether such data have been previously collected and stored.

In this regard, the present invention generally allows one to display a variety of different kinds of data. Examples of such data include: (i) data generated by a sensor, a diagnostic device or diagnostic software measuring any physical quantity (e.g., computer or other hardware performance parameters, medical data, radiation levels, weather data, seismological data, image signals, audio signals or video signals); (ii) data pertaining to sales, server performance, or other business transactions (e.g., generated by cash registers, automated teller machines, computer terminals, a data warehouse or Web application servers); (iii) data pertaining to demographics, microeconomics or macroeconomics (e.g., obtained from surveys or observations); (iv) data pertaining to business sales, revenue or accounting; (v) data pertaining to any other real-world phenomenon; or (vi) entirely synthetic data (e.g., data arising from theoretical research activities).

In certain representative embodiments, the display data are raw data, e.g., as directly input by device 14. In other embodiments, the raw data that have been measured, observed or collected by input device 14 are first pre-processed in module 16 before being displayed. Such pre-processing can include, e.g., transforming the data into another domain (e.g., into subband samples), such as by using the Modified Discrete Cosine Transform (MDCT) the Fast Fourier Transform (FFT), or a wavelet transform, or filtering the data (e.g., performing an averaging operation for thinning out the data in the event of over-sampling).

In either of the foregoing cases, the data records included within database 18 typically will include at least one timestamp, index, other attribute value or other identifying information (generally referred to herein as an "index"), which can be used as ordering information. In certain embodiments, the index provides some indication as to the source of the particular data record (e.g., when the data record was measured or collected). In other embodiments, it constitutes a measured attribute value.

It is noted that the index for each data record in database 18 need not reflect the "natural" ordering of the underlying data samples. Rather, in certain embodiments the index instead reflects a different ordering, e.g., as a result of processing performed by module 16. For example, in one embodiment sequences of time frames of the original data are transformed into a frequency domain and then ordering is based on blocks defined by specified time intervals and specified frequency ranges.

Also, although the index is explicit in certain embodiments, in others it is implied. For example, in one embodiment raw data samples are taken at five-minute intervals and stored directly into database 18. In this case, the order of the samples can be inferred by the order in which the samples are stored into database 18 and the time points (or at least relative time points) for each sample also can be inferred based on the uniform five-minute measurement interval.

In any event, the data are stored in database 18 as individual data records, typically having a common data format. As used herein, database 18 is intended to encompass any kind of database, set or other collection of data records.

Figure 2A:
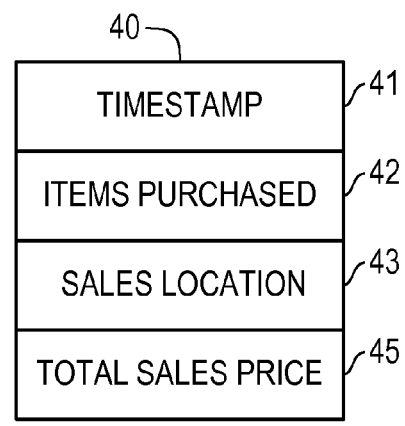
FIGS. 2A&B illustrate sample data records according to representative embodiments of the present invention.
Figure 2B:
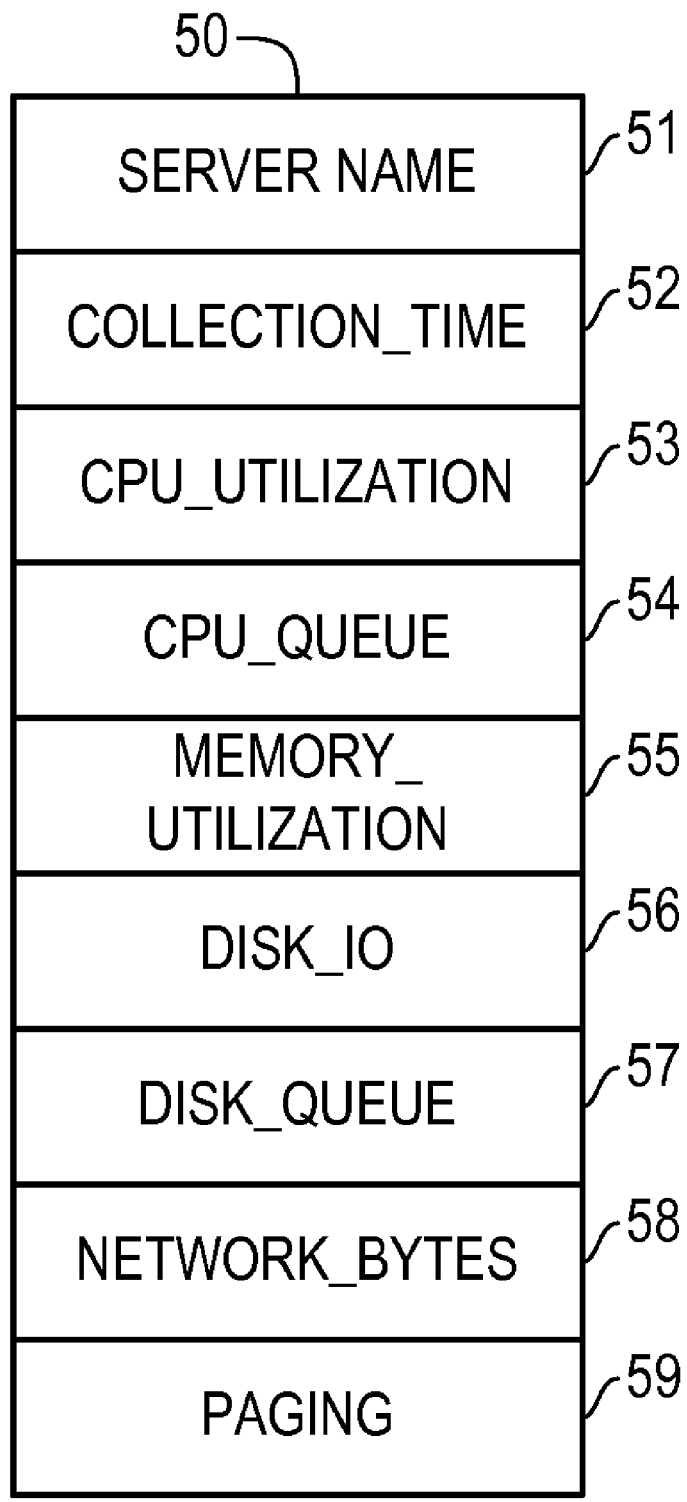

As indicated above, each such data record typically includes one or more values representing measured, observed, collected or (in certain cases) synthesized data, in addition to an express or implicit index. One example of a data record 40 according to the present invention is shown in FIG. 2A. In this case, data record 40 includes fields containing information regarding a single sales transaction. As shown, data record 40 includes a timestamp 41 indicating the time of the sale, a designation 42 of the items purchased, the geographic location 43 of the sale and the total sales price 44. Another example of a data record 50 according to the present invention is shown in FIG. 2B. In this case, data record 50 includes fields 51-59 containing information regarding server performance.

Returning to FIG. 1, the display processing module 20 retrieves data records 18 and processes them to generate colored pixel data, which are arranged in a desired manner and output as display data to display device 26. As discussed in more detail below, in preferred embodiments of the invention display processing module 20 generates and arranges the colored pixel data using a pre-defined general template that can be customized based on pre-specified types of display information 22.

Such display information 22 preferably is provided at least in part by a user 24 of the system 10, but also (or instead) can be provided either in whole or part by other systems, devices or automated processes. In this regard, it is noted that display processing module 20 itself preferably is implemented entirely in software, but in alternate embodiments is implemented in any of the other ways described herein.

Figure 3:
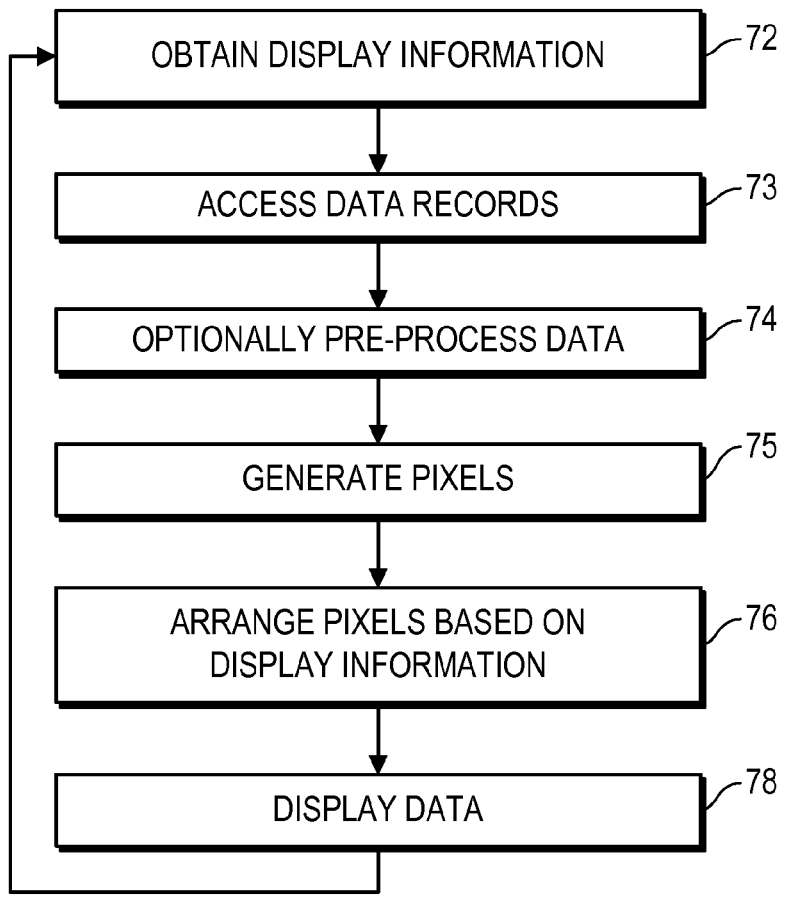
FIG. 3 is a flow diagram illustrating display processing according to a representative embodiment of the present invention.

More detail regarding the display processing of module 20, according to the preferred embodiments of the invention, is now discussed with reference to FIG. 3. Although the individual process steps are illustrated in FIG. 3 and discussed below as occurring in a particular order, it should be understood that such order is exemplary only. In many cases, the order may be altered and/or multiple steps (or portions thereof) can be performed concurrently, as will be apparent to those of ordinary skill in the art.

The display information 22 is obtained in step 72. In the preferred embodiments, the display information is provided by a user 24 via a computer-user interface. More preferably, most of such display information 22 is provided input by the user 24 selecting entries from various drop-down menus. However, in alternate embodiments any or all of such information 22 is provided in other ways, e.g., by numerically entering desired data values.

In representative embodiments of the invention, the following types of display information 22 can be specified by the user 24: (1) a designation of the set of data records to be displayed, e.g., by specifying a general category of data records, a time interval of interest and/or certain restrictions on the values of the fields in the data records (such as only data records pertaining to sales of certain items or certain classifications of items); (2) where each data record includes multiple data fields, a designation of which field will be represented by the displayed color; and (3) how the generated data pixels are to be arranged (discussed in more detail below). In addition, various other potential kinds of display information 22 are described throughout the following discussion.

Based on the data record designations input in step 72, and/or based on pre-stored designations, in step 73 the appropriate data records are retrieved from database 18. In certain embodiments, if the index information (e.g., timestamp) is implicit, this retrieval step 73 preferably also expressly identifies the appropriate index information for each data record.

In step 74, the retrieved data records are pre-processed if and as indicated by the obtained display information 22. For instance, in certain embodiments the data records are stored in database 18 as raw data, each having an associated timestamp. However, if the display information 22 indicates that the user 24 wants to display how frequency spectrum of certain stored data changes over time, then an appropriate transform is performed in this step 74.

Also, as will become apparent in the discussion below, the present invention is particularly useful for looking at every data sample that has been collected (e.g., each pixel representing a single data sample). However, in certain cases, e.g., after viewing a display of all the data samples (e.g., collected every 60 seconds), the user 24 might want to see how the data would appear upon taking the mean, median or maximum over consecutive five-minute intervals (i.e., "zooming out" from the full detail of the data in a particular manner). In such a case, the appropriate operations are performed in this step 74.

In step 75, pixel information is generated based on the retrieved data records. As indicated above, one of the fields in such data records (or in certain embodiments, a function of one or more data fields) preferably will have been designated as the display field (e.g., total sales price 44). In order to convert the values into colors, the system 10 accesses a color range and a mapping function to apply within the color range.

In one representative embodiment of the invention in which the system 10 is displaying CPU utilization rates, the color range and the mapping function are predefined, using the range between green and red, with 0% utilization corresponding to green, 100% utilization corresponding to red, and intermediate values being mapped linearly to the color spectrum between green and red. In alternate embodiments, either or both of the color range and the mapping function are user-defined as part of the display information 22, and/or any other color range and/or mapping function instead is used (e.g., logarithmic to represent sound levels). Using the range and mapping information, for each data record the value of the designated field is converted into a pixel color, typically resulting in a large number of colored pixels.

In step 76, the generated pixels are arranged in accordance with the display information 22. In the preferred embodiments of the invention, a template display structure is utilized, with the template parameters (e.g., dividing attributes in the x- and y-directions) being defined within the display information 22. More preferably, the general display template is comprised of one or more horizontal bars, with each bar having been formed from a large number of vertical lines of pixels, with the pixels being arranged in order from bottom to top within each line, and with the lines being arranged in order from left to right. This preferred configuration, together with the preferred technique for generating it, is discussed in more detail below, particularly in connection with the discussion of the sample display of FIG. 5. However, it should be understood that other display templates instead may be used. For example, in an alternate embodiment the bars are oriented vertically and the pixel lines are oriented horizontally.

Finally, in step 78, the generated data are displayed (i.e., output to a display device 26). Although illustrated in FIG. 1 as being a computer monitor, display device 26 in fact can be any kind of display device, whether having a dynamic output such as is provided by a liquid crystal display (LCD), cathode ray tube (CRT) display, plasma display or the like, or whether having a static output such as is provided by a laser or inkjet printer.

Because each data record preferably is converted into a single pixel, it often will be possible to display hundreds, thousands or even tens of thousands of data records on a relatively small display. More preferably, each displayed pixel is small, e.g., having a maximum dimension of less than five millimeters, one millimeter, or 0.5 millimeter. In fact, the size of the pixel preferably is limited only by the display resolution of the output device 26 and/or the ability of the user 24 to distinguish individual display pixels. In this regard, it is noted that the display pixel size can be larger than the minimum pixel size of the output device 26. In certain embodiments, the display pixel size is set as part of the display information 22. Also, although in the current embodiment the display pixel size is uniform across all displayed pixels, in alternate embodiments display pixel size varies, e.g., according to the individual data record represented; in one such embodiment, the display pixel size is varied to represent the value of another data field in the corresponding data record.

Upon completion of step 78, processing returns to step 72 to await any changes in the display information 22. For example, upon reviewing the results of the foregoing display process, the user 24 might decide to alter some parameter of the display information 22, e.g., in order to investigate an apparent anomaly, pattern or trend, or simply to look at other data. In one particular example, the user 24 might decide to change any or all of: the field in the data records to which the pixel color pertains, the definition of the set of data records that are being retrieved (i.e., that form the basis for the display), the arrangement of the pixels (e.g., by modifying the pixel spacing, line spacing or bar spacing), the color mapping function, the color range, and/or any pre-processing performed in step 74. As a result of this iterative process of reviewing data and then modifying the display information 22 to view the data on some other basis, the present invention provides a useful tool for studying large quantities of data in different ways.

Figure 4:
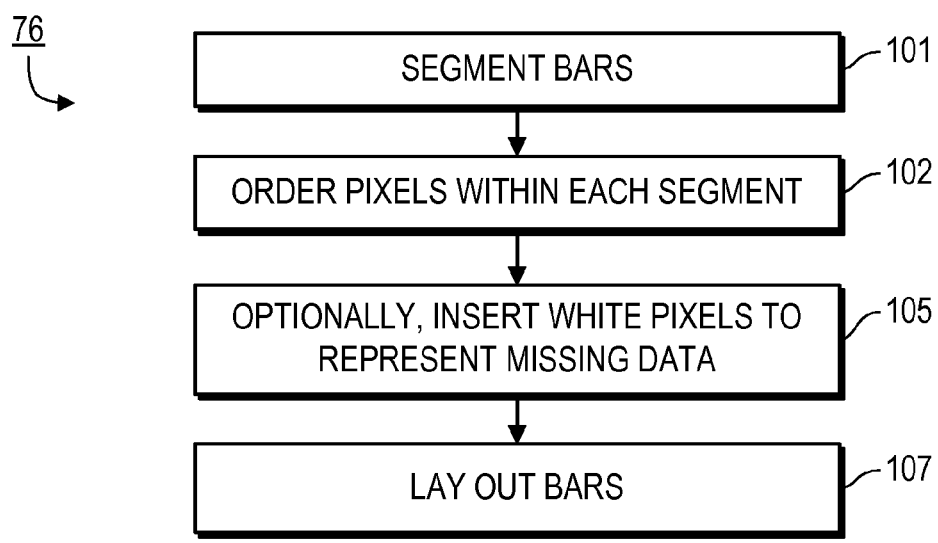
FIG. 4 is a flow diagram illustrating a technique for arranging pixels according to a representative embodiment of the present invention.

One technique for arranging the colored pixels in step 76 is now discussed with primary reference to the flow diagram in FIG. 4. This technique uses the preferred display template, mentioned above. The technique of FIG. 4 preferably also is implemented entirely in software, but in alternate embodiments is implemented in any of the other ways described herein.

Initially, in step 101 the bars of pixel lines are segmented based on a dividing attribute, typically time. In the present example, each bar is to be oriented horizontally. However, the specific arrangement of the bars preferably depends upon the display information 22.

In one example, the user 24 specifies a number of different variables (e.g., different fields corresponding to different system attributes within designated data records) to be displayed, with each variable having its own bar. Such bars preferably are then displayed by system 10 underneath each other, aligned by a horizontal axis which indicates time. Accordingly, the user 24 is able to easily identify trends, patterns and/or correlations among the different variables.

In a second example, the user 24 specifies a variable and a date and/or time range for which the data are to be displayed, but limiting the duration of each bar (e.g., to one week). In such a case, a long time interval to be displayed automatically is divided into such one-week intervals, displayed beneath each other. Accordingly, the user 24 is able to easily identify recurring trends, patterns and time correlations pertaining to a single variable.

The foregoing examples are merely illustrative. Any combinations of them and/or of other display techniques instead may be used in the various embodiments of the invention.

In addition to the foregoing, in certain embodiments of the invention the settable parameters in the display information 22 allow the user 24 to specify whether individual horizontal bars should be segmented, e.g., on a daily or hourly basis. Thus, instead of a single long continuous bar, each bar is segmented (e.g., with a small gap) that indicates the next day, hour, etc.

In step 102, the colored pixels are ordered within each of bar segment, preferably by arranging them into pixel lines based on the display information 22. In this regard, the system 10 preferably permits the user 24 to specify the specific ordering attribute within each bar segment, e.g., the line-to-line divisions or spacing. For example, with respect to the display of time-based data, the user might specify a uniform line-to-line spacing corresponding to one-hour increments. Then, each line of pixels would represent a one-hour time interval, i.e., all of the data records for each one-hour time interval would have corresponding pixels within the same pixel line. Alternatively, the user might specify ordering within each bar segment based on one of the data record attributes. Examples of these different ordering approaches are presented below.

In one example, the pixels are arranged within each pixel line based on time, from the bottom to the top of the pixel line. Keeping with the same example mentioned above, the pixels corresponding to the earlier time samples would be lower than the pixels corresponding to later time samples. However, the ordering within each pixel line is performed differently in different embodiments of the invention. In certain embodiments, the ordering criteria are input by the user 24 as part of the display information 22.

In addition, in certain embodiments of the invention the display information 22 also controls other aspects of the pixel arrangement. For example, one potential input from user 24 is a flag indicating whether or not to indicate missing data samples. Where data samples are taken at regular time intervals (e.g., periodic measurements of system performance), it often is advantageous for the display system 10 to indicate where data samples are missing, if for no other reason than to ensure that the actual data samples line up in a time-consistent manner.

If display information 22 (or a pre-specified setting) requests indications of missing data samples, then in step 105 pixels are generated for the missing data samples, preferably using a pre-specified color, such as white. On the other hand, if the data samples to be displayed are expected to have been received on an irregular basis (e.g., sales transactions), it generally is advantageous merely to stack up the pixels (e.g., each corresponding to a different sales transaction) for the subject time interval. Examples of these cases are described below.

In step 107, the bars of pixel lines are laid out as described above in connection with step 101.

Specific display examples are now discussed with reference to FIGS. 5-10. In these figures, different colors are indicated by different black-and-white fill patterns. It should be noted that only a few different fill patterns are shown in these drawings. Needless to say, the use of actual color permits much finer resolution and much easier visual distinctions. Thus, with actual color and with each pixel representing a different data point, the display structures according to the present invention permit a user 24 to view a large amount of data in a single instant and, as noted above, to easily discern patterns, problems, potential correlations and the like.

Figure 5:
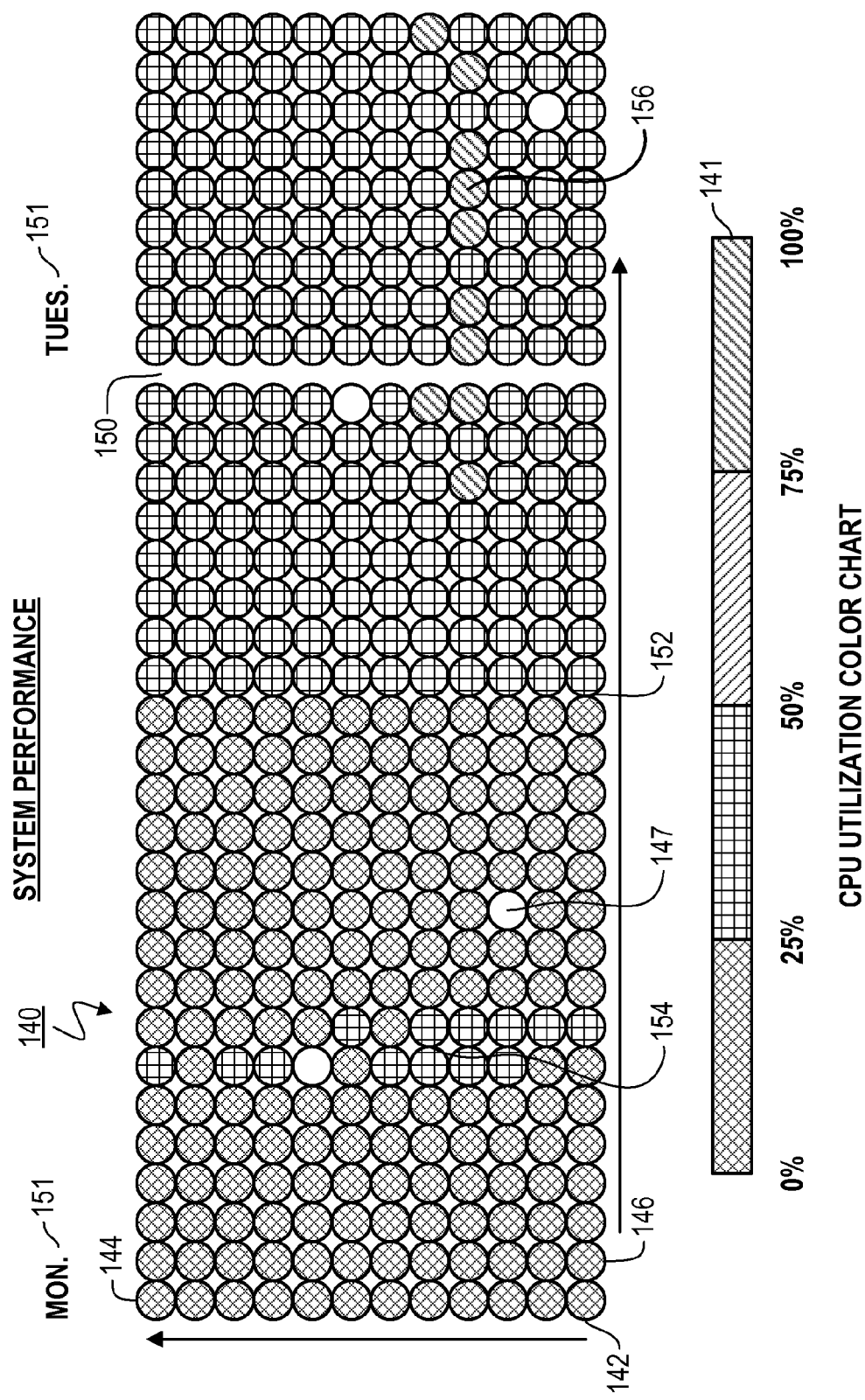
FIG. 5 illustrates a portion of a display that includes a bar of vertical pixel lines, with individual pixels corresponding to periodic measurement samples, according to a representative embodiment of the present invention.

FIG. 5 illustrates a portion of a horizontally oriented bar 140 of vertical pixel lines, with each pixel corresponding to a different time sample of CPU utilization. Color chart 141 indicates what the various pixel colors mean in terms of percentage of CPU utilization. In this example, only four different fill patterns are used to represent different colors, while in practice a continuous range of colors preferably would be indicated by color chart 141, representing the full range of pixel colors (in this example, from green to red) and, correspondingly, the full range of potential data values (in this case, from 0% to 100%).

In the example illustrated in FIG. 5, the pixel lines correspond to one-hour time segments (i.e., each pixel line corresponds to a uniform time interval of one hour) and the pixels are arranged from bottom to top and left to right. Thus, the earliest data point illustrated corresponds to pixel 142 and then subsequent data points correspond to successively higher pixels in the same vertical pixel line until reaching the pixel 144 corresponding to the last data point of the hour. That is, the pixels from pixel 142 to pixel 144 constituted the first pixel line in the Monday bar segment of bar 140. The very next data sample corresponds to pixel 146 (i.e., the first pixel in the second pixel line) and so on.

In FIG. 5, the missing data points are indicated by an all-white pixel, such as pixel 147. Accordingly, the user 24 easily can identify where data points are missing and possibly identify any patterns that might suggest underlying problems. In addition, as noted above, the missing-data-point pixels serve to maintain the time-consistency of the display. This feature might not be important where only a couple of data points are missing. However, if a large number of data points are missing and such filler pixels are not used, the ability to spot patterns might be impaired. In the present example, the data points were scheduled to be taken at five-minute intervals (although, as noted, some data points are missing). Because filler data points are used, each pixel line is exactly 12 pixels high (60 mins./line÷5 mins./pixel=12 pixels/line), providing a rectangular-shaped bar 140, and there is a uniform time interval between pixels of exactly 5 minutes.

Based on the display information 22, the bar 140 has been segmented by day, so that a small gap 150 separates portions of the bar 140 corresponding to different days. Because each such day has 24 hours, each segment of bar 140 has 24 adjacent vertically oriented pixel lines. The top labels 151 indicate when the data samples corresponding to the pixels were taken (i.e., the timestamps for the data samples).

Generally speaking, where the display index is time (e.g., as in the preceding example), a bar of pixel lines can be generated in the following manner. In such a case, the display information 22 preferably includes three main attributes: a Dividing Attribute $D_x$ for partitioning the bar into segments (e.g., one-day or one-hour segments), an Ordering Attribute $T_y$ for specifying the time interval associated with each pixel line (e.g., one-hour or five-minute intervals) and a Coloring Attribute C for mapping data values to colors. Accordingly, the pixel placement within one time category can be performed using a three-dimensional sort. The basic idea of this heuristic pixel placement algorithm is to partition the data set into subsets according to $D_x$, and use those subsets to place the start- and end-pixels according to the time interval order.

By displaying data points in the manner illustrated in FIG. 5, the user 24 easily can identify global patterns, such as the general shift in values around time point 152. At the same time, the user 24 also can easily identify local exception points, such as the cluster of points 154, indicating a temporary increase in CPU usage. Either such observation might prompt the user 24 to investigate further. In some cases, the pattern will be fairly obvious without further investigation. For example, the horizontal line of pixels 156 indicates an increase at approximately the same point each hour over a number of hours, possibly indicating the existence of a process that has been scheduled to run at the same point each hour.

Figure 6:
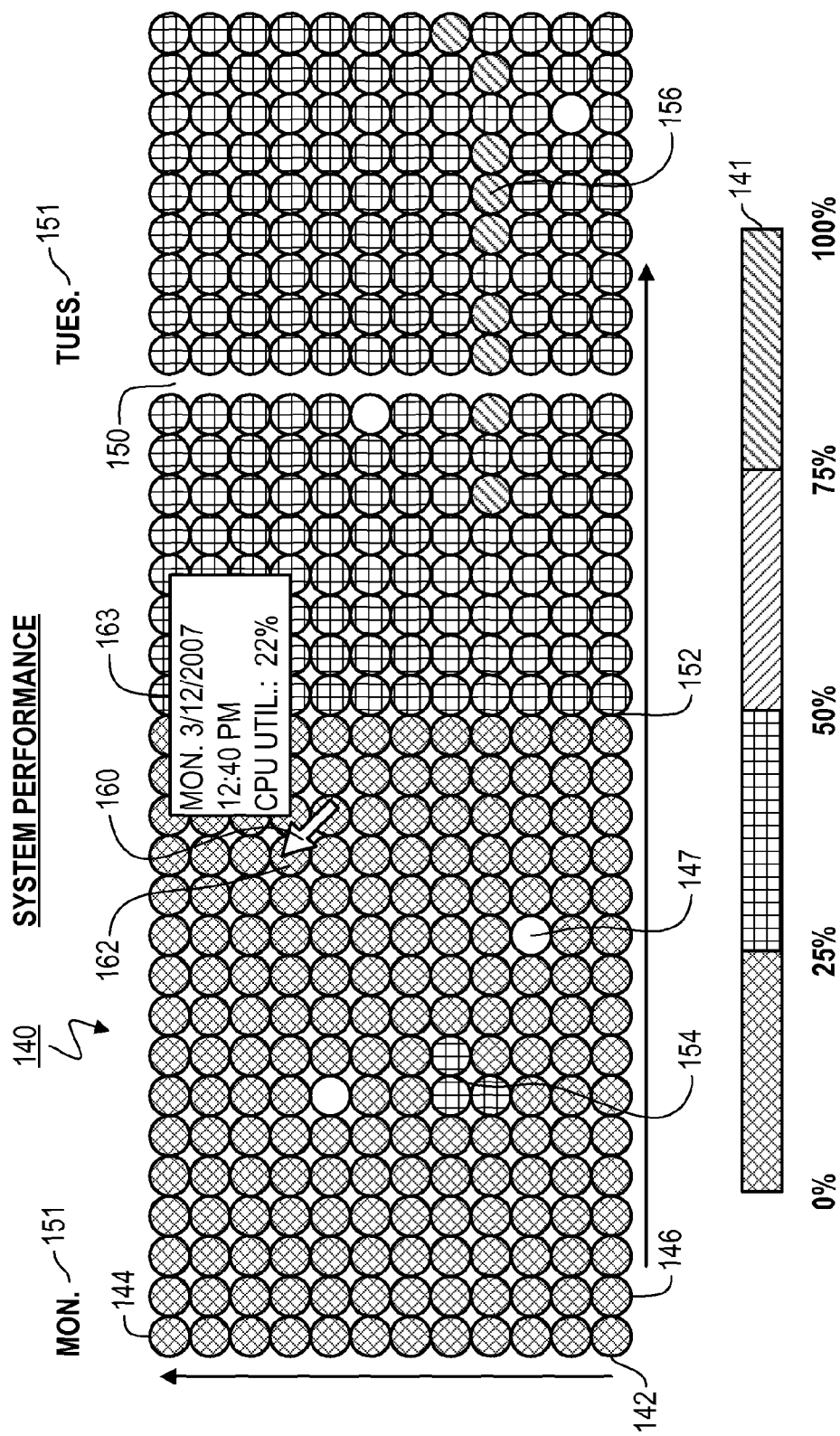
FIG. 6 illustrates a first example of a colored-pixel display in which detailed server-performance data record information is viewed along with pixel information, according to a representative embodiment of the present invention.

In the event that the output display device 26 is a computer monitor or otherwise produces dynamic and interactive output, the user 24 preferably has the ability to more closely examine any of the displayed data records. For example, FIG. 6 illustrates the same portion of bar 140 that is shown in FIG. 5. In addition, as shown in FIG. 6, the user 24 can drag her cursor 160 over any displayed pixel (e.g., pixel 162) and automatically a window 163 pops up (preferably close to the cursor 160) displaying the data (preferably all of the data) in the data record corresponding to the designated pixel 162. Moving cursor 160 to a different pixel preferably automatically changes the contents of the window 163 to correspond to the data record for that new pixel (and preferably automatically moves window 163 to the new location). Accordingly, not only can the user 24 easily view a large quantity of data values, but also can drill down to individual data records and see the detailed information pertaining to them. In alternate embodiments, window 163 is fixed (e.g., in a corner of the display, so as not to obscure the pixel data in bar 140).

A variety of other techniques may be used for designating pixels to be more closely examined, with the specific technique depending upon the desired results. For example, in certain embodiments system 10 permits the user 24 to select a block of pixels (e.g., by left-clicking a mouse and drawing a rectangle around the pixels) and request a desired operation to be performed on the selected pixels. For example, in one embodiment, after the pixels have been selected, the user 24 selects from a drop-down list to find the maximum, minimum, mean or standard deviation of the displayed values within the selected group.

Figure 7:
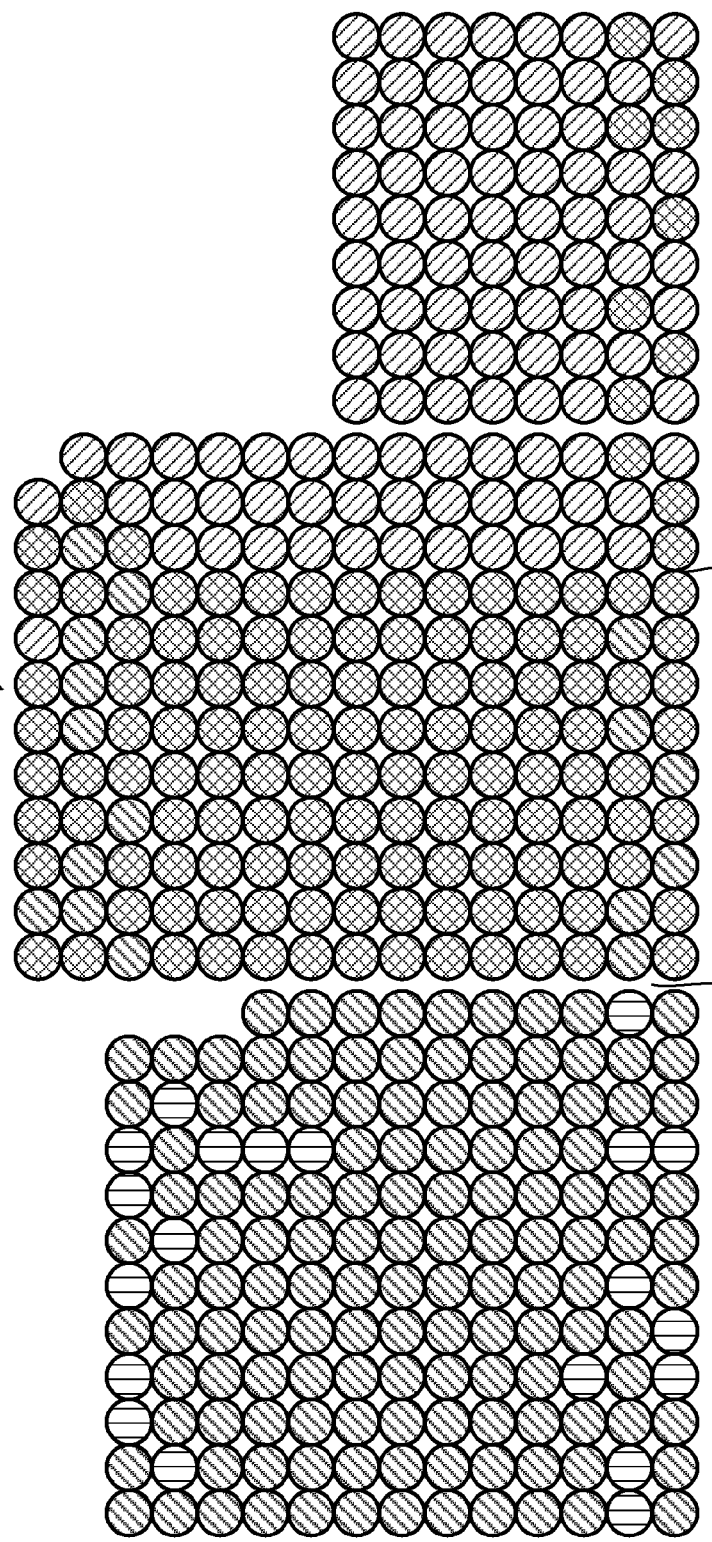
FIG. 7 illustrates a portion of a display that includes a bar of vertical pixel lines, with individual pixels corresponding to data records of sales transactions, according to a representative embodiment of the present invention.

FIG. 7 shows a portion of a display that includes a horizontally oriented bar 200 of vertical pixel lines, with individual pixels corresponding to data records of sales transactions (i.e., with each pixel representing a single sales transaction), according to a representative embodiment of the present invention. As in the previous example, the pixels are arranged in chronological order starting with the bottom left-hand pixel and moving upwardly until the end of the segment defined by the current pixel line, then beginning at the bottom of the next pixel line to the right, and so on. In this example, each bar segment (e.g., 5:00, 6:00, 7:00) consists of 12 pixel lines, and the height of each bar segment indicates the number of transactions that occurred during the time interval corresponding to such bar segment. Color chart 201 indicates what the various pixel colors mean in terms of sales price for the transaction represented by the pixel. Again, in FIG. 7 only four different fill patterns are used to represent different colors, while in practice a continuous range of colors preferably would be indicated by color chart 201, representing the full range of pixel colors.

The example shown in FIG. 7 assumes that the underlying data records have the format of data record 40 (shown in FIG. 2), and the displayed value (i.e., which is reflected by the color of the corresponding pixels) is the total sales price 44 of the transaction. Thus, using the display shown in FIG. 7, not only is the user 24 able to quickly identify how the volumes of sales transactions change over time (based on the heights of the pixel lines), but also can see the value of each sales transaction (based on the pixel colors). As with the previous example, the user 24 can quickly identify overall trends, such as the changes occurring around points 202 and 204, as well as exceptions and sub-trends, such as the slight drop-off in total sales price per transaction occurring roughly at five-minute intervals, as indicated by the exception bands (differently colored pixels) near the top and bottom of displayed bar 200.

Unlike the example shown in FIGS. 5&6, in the example shown in FIG. 7 no filler pixels are used. The reason is that, unlike periodic system measurements, sales transactions do not occur at regular intervals; accordingly, the user 24 has determined that no meaningful information would be obtained by using filler pixels. To the contrary, by not using filler pixels the heights of the individual pixel lines have independent meaning, i.e., indicating the number of sales transactions within each five-minute interval.

In the present example, the data record 40 includes multiple fields, but only the value for a single field (i.e., total sales price 44) has been designated by user 24 for display. The other fields in data record 40 can be used, e.g., for selecting which data records should be displayed. For example, the user 24 might designate in display instructions 22 only to display sales records for a given time interval (specified by timestamp 41) within a given geographic region (specified by sales location 43).

Figure 8:
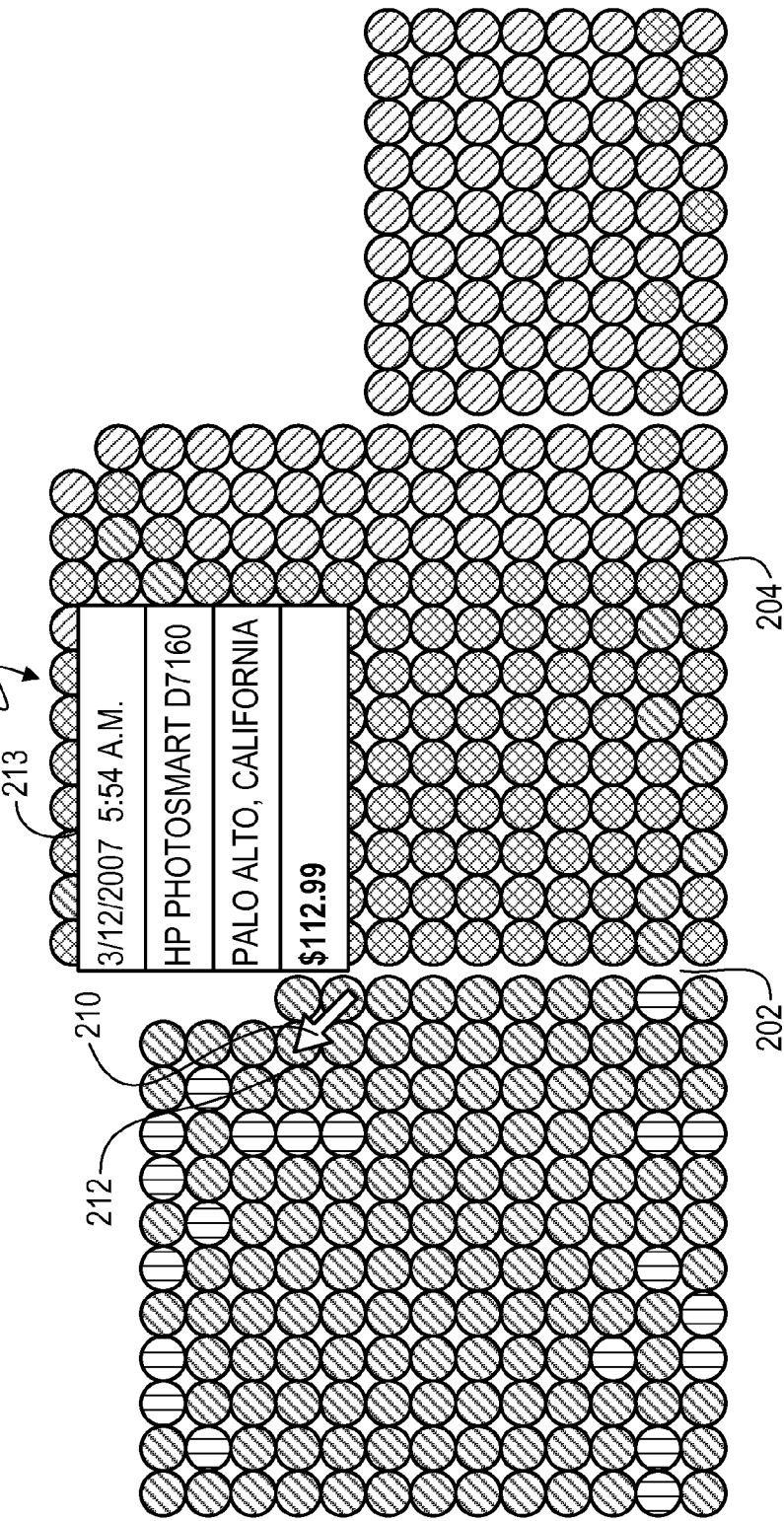
FIG. 8 illustrates a second example of a colored-pixel display in which detailed data record information is viewed along with pixel information, according to a representative embodiment of the present invention.

FIG. 8 illustrates the same portion of bar 200 that is shown in FIG. 7. In addition, similar to the example discussed above, as shown in FIG. 8 the user 24 can drag her cursor 210 over any displayed pixel 212 and automatically a window 213 pops up displaying the data in the data record corresponding to the designated pixel 212.

In this example, the individual data record displayed in window 213 has multiple data fields in addition to a timestamp. The one data field that is represented by the pixel color is highlighted in window 213 (by bolding in the present example). However, the other fields provide other details regarding the subject sales transaction.

Figure 9:
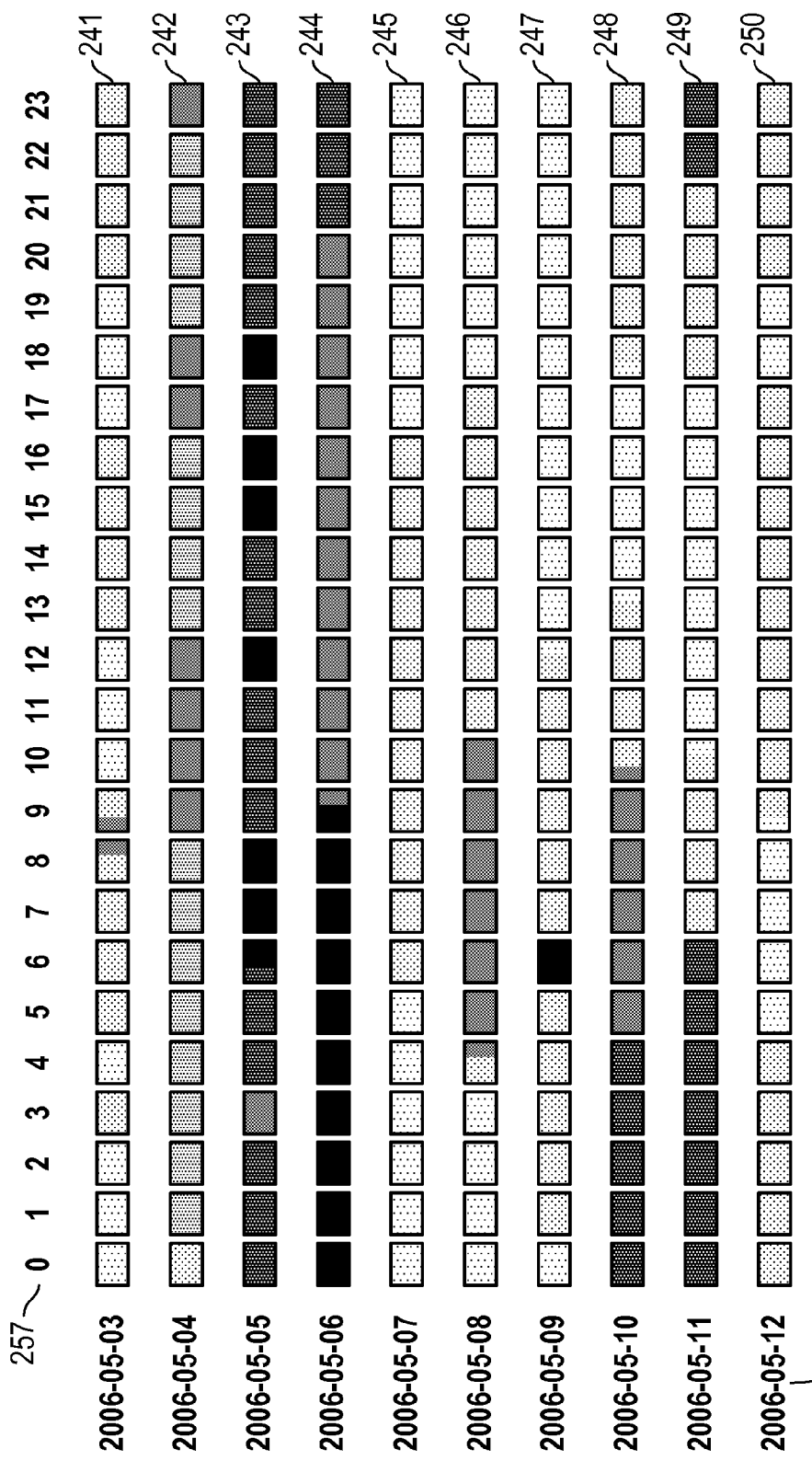
FIG. 9 illustrates a portion of a display that includes an aligned set of bars of vertical pixel lines, with the individual bars representing different time intervals, according to a representative embodiment of the present invention.

FIG. 9 illustrates a portion of an entire display, including multiple horizontally oriented bars 241-250 of vertical pixel lines and a color chart 255 indicating the meaning of each pixel color. Here, the pixel colors represent production figures over time, with the bars 241-250 having been segmented into one-hour time intervals and with each bar representing information from a single day. The top row 257 indicates the hour of the day and the left column 258 indicates the specific day. In the portion of the display shown in FIG. 9, all of the data measurements over a 10-day period (potentially thousands of measurements) can be observed at once. Moreover, by arranging the data in the manner illustrated, a user 24 easily can identify day-to-day trends and patterns.

Figure 10:
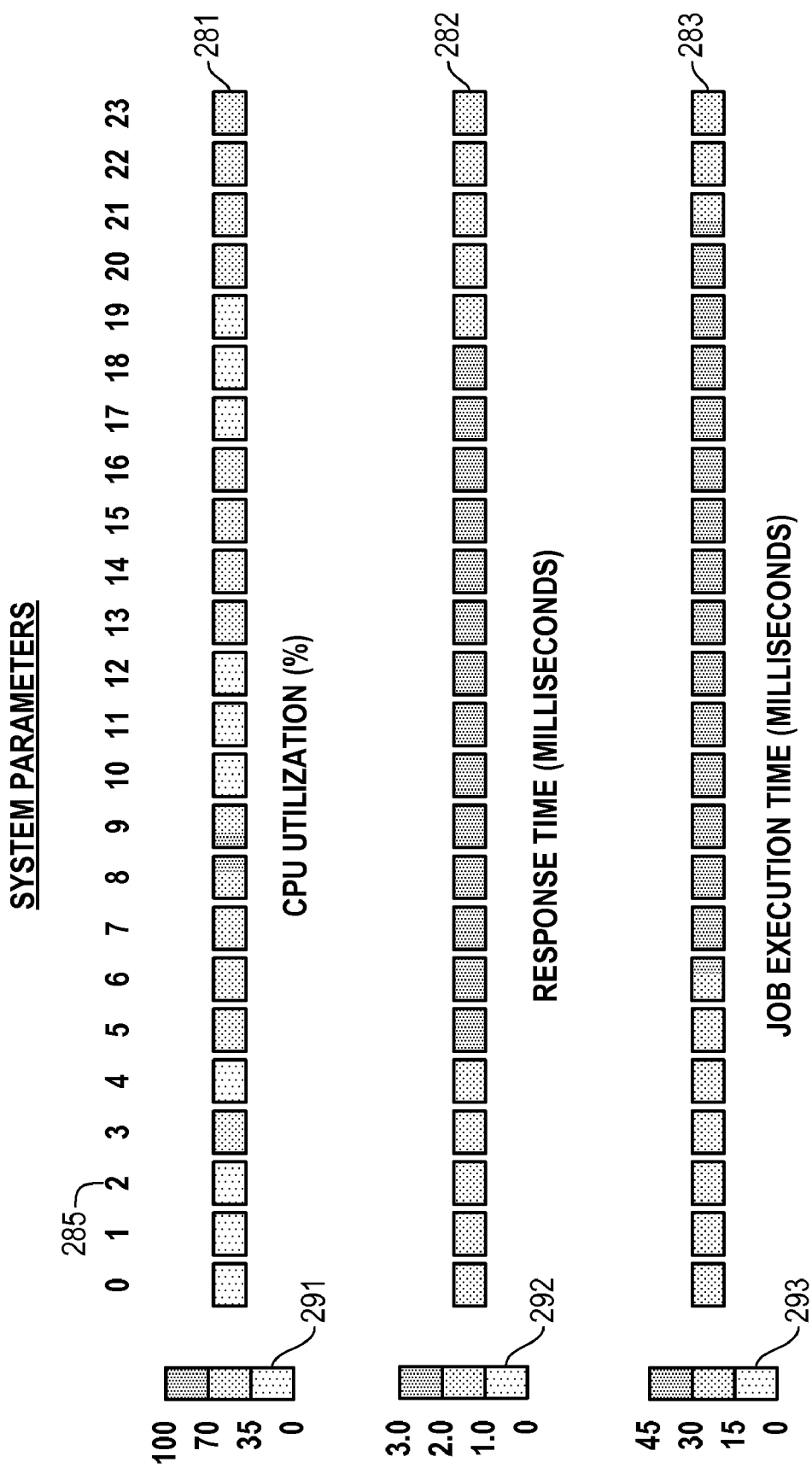
FIG. 10 illustrates a portion of a display that includes an aligned set of bars of vertical pixel lines, with the individual bars representing different system parameters, according to an alternate representative embodiment of the present invention.

FIG. 10 illustrates a portion of an entire display, including multiple horizontally oriented bars 281-283 of vertical pixel lines. Here, the pixel colors represent periodic measurements of server performance attributes. More specifically, each of the bars 281-283 represents a different system attribute: percentage CPU utilization 281, response time 282 in milliseconds and job-execution time 283 in milliseconds. The bars 281-283 have been segmented on an hourly basis and the portion of the display shown in FIG. 10 encompasses a 24-hour period. The hour indications are displayed in row 285. Because each of the bars 281-283 pertains to a different attribute, correspondingly different color charts 291-293 are provided for interpreting the meaning of the different colors in each such bar 281-283. It is noted that the different displayed attributes could pertain to different fields in the same data records, fields in different data records, or any combination of the two, e.g., as specified by the user 24 in display information 22.

Figure 11:
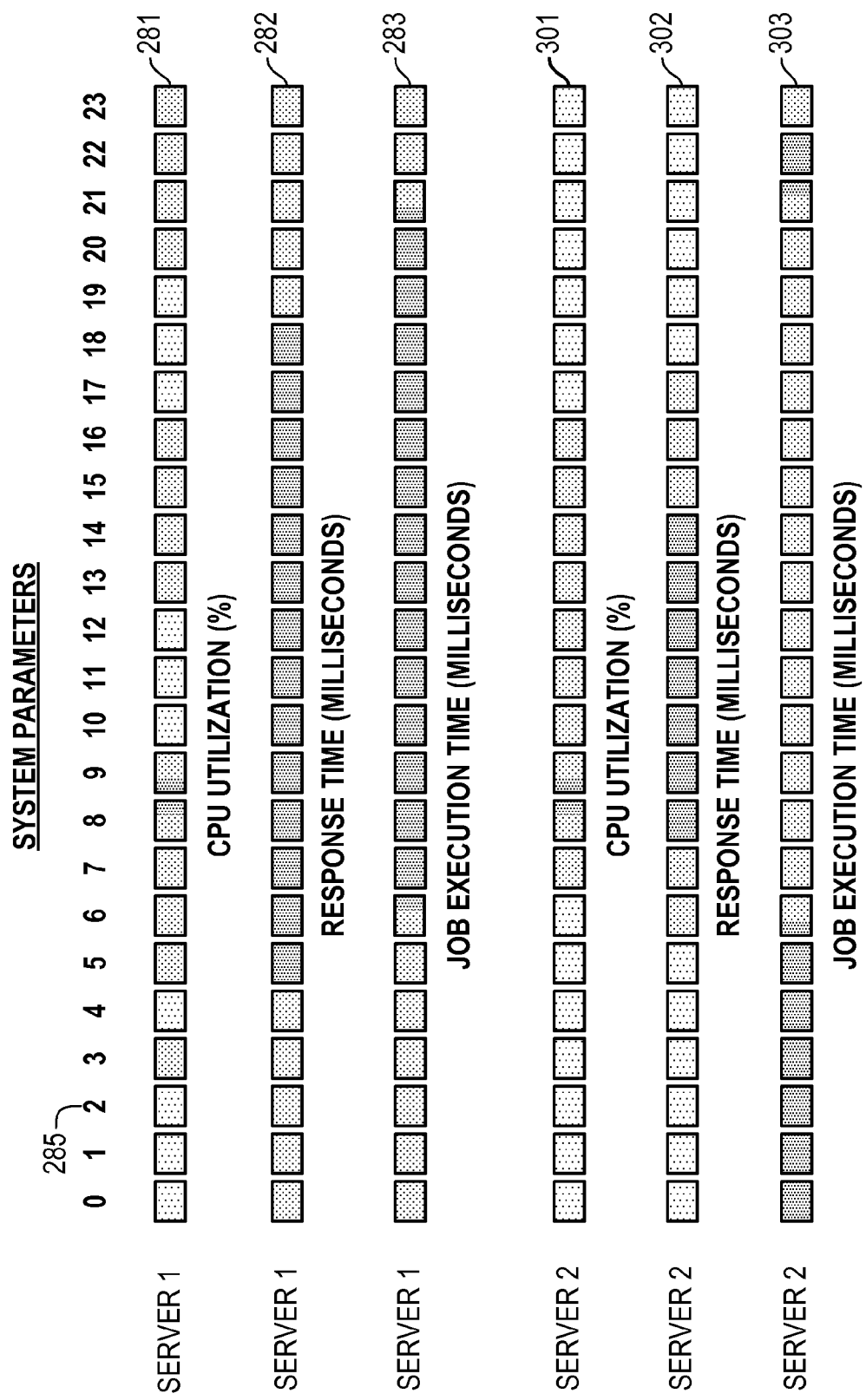
FIG. 11 illustrates a portion of a display that includes an aligned set of bars of vertical pixel lines, with the individual bars representing different system parameters for different servers, according to an alternate representative embodiment of the present invention.

FIG. 11 illustrates a portion of a display that includes an aligned set of bars of vertical pixel lines. In this case, the individual bars represent different system parameters (e.g., different attributes) across different servers (e.g., different categories). More specifically, each of the bars 281-283 and 301-303 represents a different system attribute for servers 1 and 2, respectively: percentage CPU utilization 281 and 301, response time 282 and 302 (in milliseconds), and job-execution time 283 and 303 (in milliseconds), segmented in the same manner shown in FIG. 10. The same color charts also apply as in FIG. 10, although they are not expressly shown in FIG. 11.

In both of FIGS. 10 and 11, the data records are arranged in a vertical pixel lines. In FIG. 10, records are ordered by time (e.g., minutes) within each time segment (e.g., hour). In FIG. 11, the records are ordered by a system attribute (e.g., percentage CPU utilization). The display shown in FIG. 11 sometimes is referred to herein as a multiple time series and enables a user 24 to view large quantities of multi-dimensional data at a glance.

In most of the embodiments described above, the pixels are displayed according to a single index, typically time or an attribute value, with the pixel lines oriented vertically and the bars of pixel lines oriented horizontally. However, in the preferred embodiments, the user 24 has significant flexibility in configuring how the output display should appear.

Figure 12:
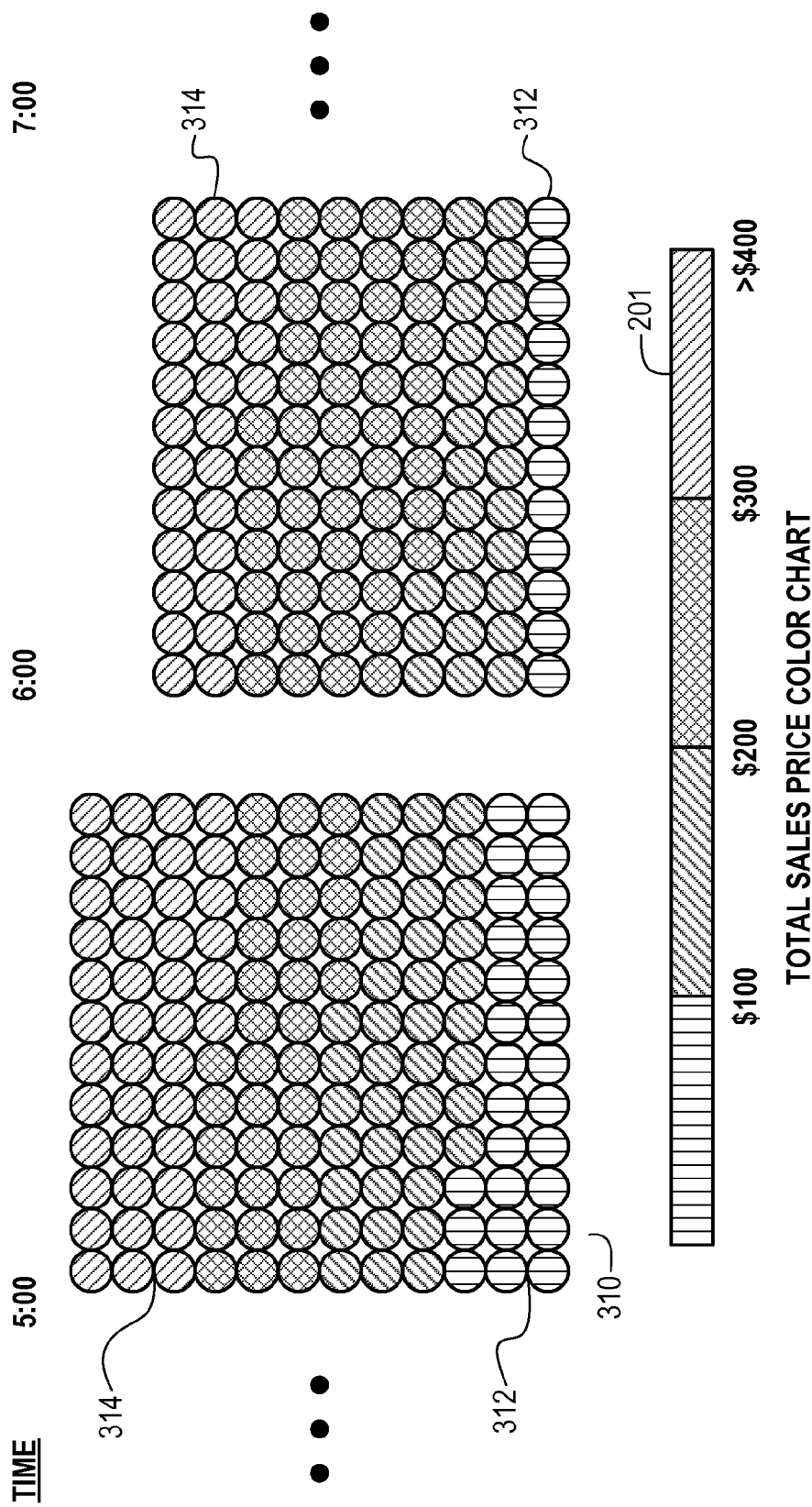
FIG. 12 illustrates a portion of a display that includes an aligned set of bars of pixel lines, with individual pixels corresponding to data records of sales transactions, and with the pixels sorted by data value within each segment, according to an alternate representative embodiment of the present invention.

For example, in FIG. 12 the user 24 has selected display parameters identical to those used to generate the display 200 shown in FIG. 7, except that here the user 24 has selected sorting within each bar segment (in this case, each one-hour time interval) based on value of the transaction and ordering within each segment from left to right and bottom to top. Thus, shown in FIG. 12, is a portion of a single horizontally oriented bar 310 of pixel lines, with the lower horizontal pixel lines 312 in each segment having lower transaction values than the higher pixel lines 314 in the same bar segment. Although the horizontal segments correspond to time (i.e., one-hour time intervals in this case), the vertical divisions within each segment correspond to different ranges of transaction values (or, more generally, parameter values). As result, the user 24 can easily identify the number of transactions within any particular value range that occurred within any particular one-hour segment. As with the other displays, the user 24 preferably also has the ability to drill down into each data record, e.g., by moving the cursor over individual pixels.

In the embodiments discussed above, all of the bars are oriented horizontally. However, it should be noted that the present invention also can be implemented by vertically orienting the bars of pixels. In any event, in the preferred embodiments of the invention, at least one bar of pixels is segmented into bars segments, with the individual pixels within each segment (each preferably corresponding to a single data record) being ordered as desired by the user 24. Also, in the preferred embodiments each bar is comprised of multiple adjacent pixel lines, again, with the individual pixels being ordered as specified by the user 24.

As discussed above, the display of color pixels, each representing a different data value, in the various patterns according to the present invention often permits large quantities of data to be examined at a glance. In the preferred embodiments, each pixel corresponds to exactly one single data record (e.g., actual data values rather than aggregations) and each data record has an associated time, typically indicating the time at which the values in the data record were generated. In such a case, the data preferably are divided in time in at least three different ways: the time interval corresponding to each pixel line (e.g., one hour), the time interval into which each bar is segmented (e.g., one day), and the length of bar (e.g., one week, with successive weeks displayed as separate bars underneath each other).

In addition, in certain embodiments the pixel lines also are segmented (e.g., into uniform time intervals) by providing small vertical gaps, similar to how the bars are segmented in certain embodiments discussed above. If such vertical segmenting also is used, filler pixels (as discussed above) are used in certain embodiments to denote missing data samples. Also, for irregularly occurring data samples, the height of the bar is adjusted to accommodate the number of samples in each segmented vertical interval and/or an escape code is used to visually display situations where there are more data records than will fit within a particular segmented vertical interval.

In the preferred embodiments, the user 24 and is allowed to flexibly define the display parameters (e.g., via display information 22). Then, after the corresponding display has been viewed, the user 24 preferably is permitted to flexibly redefine the display parameters (e.g., by only changing individual parameters or creating an entirely new set of display parameters). As a result, the user 24 can focus in on areas of particular interest (e.g., where there appears to a trend or anomaly) and/or display different combinations of data over different periods of time in order to attempt to identify patterns or correlations.

The embodiments discussed above represent each data value as a color selected from a spectrum of colors. In this regard, any aspect of color display may be modified based on one or more data values within a data record, including, e.g., any or all of hue, saturation and lightness value or any parameter in any other color system.

Finally, in the about events discussed above, when different attributes (or data values) are displayed, they are displayed using a common time axis. Such an approach is useful for identifying patterns with respect to attributes that are likely to be correlated at exactly the same time or with only a small temporal separation. However, in certain cases it might be anticipated that different attributes have some correlation with each other, but only over the long term. For example, changes in macroeconomic policy might only have effect on macroeconomic indicia over some period of months or years. Similarly, the effect of an advertising or marketing effort on sales figures might only be observed after some delay. For these purposes, the user 24 preferably is allowed to specify (e.g., as part of the display information 22) a time offset for the display of one attribute with respect to another. In the generated display, this offset can be indicated, e.g., by a notation of "t+3 weeks" next to a particular attribute bar.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of displaying data, comprising:
    accessing, by a computer, a set of data records that have associated time indexes;
    generating, by the computer, pixels to represent the data records, the colors of the pixels being based on attribute values of the data records;
    arranging, by the computer, the pixels into plural bars that represent first time intervals;
    segmenting, by the computer, each of the bars into bar segments that represent second time intervals;
    arranging, by the computer, the pixels into lines within each of the bar segments based on the associated time indexes, with each line corresponding to a third time interval and adjacent lines corresponding to adjacent third time intervals, wherein the first, second, and third time intervals are different time intervals;
    displaying the pixels as arranged in the bars, bar segments, and lines of pixels;
    inserting visible gaps between bar segments in each of the bars; and
    in each of the lines, providing filler pixels to represent missing data records to cause lengths of the lines to be equal, wherein each of the filler pixels has a predefined color that is different from colors assigned to pixels associated with the data records in the set.

2. A method according to claim 1, wherein the bar segments are defined by a specified dividing attribute of the data records, and wherein the pixels are arranged within each of the bar segments based on a specified ordering attribute.

3. A method according to claim 1, wherein the pixels are arranged chronologically within each of the lines.

4. A method according to claim 1, wherein each line corresponds to a uniform time interval, wherein the third time interval is the uniform time interval.

5. A method according to claim 1, wherein each pixel represents exactly one data record instead of aggregations of data records, the method further comprising:
    organizing the pixels within each of the bar segments according to values of an ordering attribute of the data records.

6. A method according to claim 1, further comprising obtaining display information from a user, and wherein the pixels are arranged in the bars, bar segments, and lines in accordance with the display information.

7. A method according to claim 1, wherein the lines have different numbers of pixels, with a number of pixels in each line depending upon a number of data records within the third time interval corresponding to the line.

8. A method according to claim 1, wherein the pixels are displayed on a dynamic display device, and wherein contents of a desired data record automatically are displayed upon designating a corresponding one of the pixels.

9. A method according to claim 8, wherein said designating comprises dragging a cursor over said one of the pixels.

10. A method of displaying data, comprising:
    accessing, by a computer, a set of data records that have associated time indexes;
    generating, by the computer, pixels to represent the data records, the colors of the pixels being based on values of a coloring attribute of the data records;
    arranging, by the computer, the pixels into bars of parallel lines, based on the associated time indexes;
    segmenting each of the bars into bar segments, wherein the lines represent respective first time intervals, the bar segments represent respective second time intervals, and the bars represent respective third time intervals, and wherein the first, second, and third time intervals are different time intervals;
    displaying the pixels as arranged in the bars, bar segments, and lines of pixels,
    wherein each pixel corresponds to a different single data record, and each of the pixels has a maximum dimension of less than 5 millimeters;
    receiving user input to indicate whether filler pixels are to be used;
    in response to receiving user input indicating that filler pixels are to be used, providing filler pixels in each of the lines to represent missing data records to cause lengths of the lines to be equal, wherein each of the filler pixels has a predefined color that is different from colors assigned to pixels associated with the data records in the set; and
    in response to receiving user input indicating that filler pixels are not to be used, displaying the lines of pixels without filler pixels for the missing data records.

11. A method according to claim 10, wherein each of the parallel lines corresponds to a uniform time interval, the first time interval being the uniform time interval.

12. A method according to claim 10, wherein the pixels are displayed on a dynamic display device, and wherein contents of a desired data record automatically are displayed upon designating a corresponding one of the pixels.

13. A method according to claim 10, wherein each of the pixels corresponds to respective single data records rather than aggregations of data records.

14. A computer-readable medium storing computer-executable instructions for displaying data, said instructions upon execution causing a computer to:
- access a set of data records that have associated time indexes;
- generate pixels to represent the data records, the colors of the pixels being based on values of the data records;
- arrange the pixels into plural bars that represent first time intervals;
- segment each of the bars into bar segments that represent second time intervals;
- arrange the pixels into lines based on the associated time indexes, with each line corresponding to a third time interval and adjacent lines corresponding to adjacent third time intervals, wherein the first, second, and third time intervals are different time intervals;
- display the pixels as arranged in the bars, bar segments, and lines of pixels;
- in each of the lines, provide filler pixels to represent missing data records to cause lengths of the lines to be equal, wherein each of the filler pixels has a predefined color that is different from colors assigned to pixels associated with the data records in the set.

15. A computer-readable medium according to claim 14, wherein each pixel represents exactly one data record, the instructions upon execution causing the computer to further:
- organize the pixels within each of the bar segments according to values of an ordering attribute of the data records.

16. A computer-readable medium according to claim 14, wherein the instructions upon execution cause the computer to further:
- insert visible gaps between bar segments in each of the bars.

17. The computer-readable medium according to claim 14, wherein each of the pixels represents exactly one data record instead of aggregations of data records, the instructions upon execution causing the computer to further:
- organize the pixels within each of the bar segments according to values of an ordering attribute of the data records.

* * * * *

UNITED STATES PATENT AND TRADEMARK OFFICE
CERTIFICATE OF CORRECTION

PATENT NO. : 7,760,203 B1 Page 1 of 1
APPLICATION NO. : 11/742512
DATED : July 20, 2010
INVENTOR(S) : Ming C. Hao et al.

It is certified that error appears in the above-identified patent and that said Letters Patent is hereby corrected as shown below:

In column 15, lines 4-7, in Claim 14, delete "A computer-readable medium storing computer-executable instructions for
  displaying data, said instructions upon execution causing a computer to:" and insert
-- A computer-readable medium storing computer-executable instructions for displaying data, said instructions upon execution causing a computer to: --, therefor.

Signed and Sealed this

Sixteenth Day of November, 2010

David J. Kappos
*Director of the United States Patent and Trademark Office*